United States Patent

[11] 3,631,649

[72] Inventors Kenneth S. Close
Macedon, N.Y.;
Alson R. Harm, Colerain Township,
Hamilton County; Charles R. Hood,
Springfield Township, Hamilton County,
both of Ohio
[21] Appl. No. 864,283
[22] Filed Oct. 1, 1969
[45] Patented Jan. 4, 1972
[73] Assignee The Procter & Gamble Company
Cincinnati, Ohio

[54] MACHINE AND METHOD FOR PACKAGING A PLURALITY OF CYLINDRICAL ARTICLES
23 Claims, 25 Drawing Figs.

[52] U.S. Cl.................................................. 53/3,
53/14, 53/30, 53/59 R, 53/137, 53/184, 53/198 R, 198/20 R
[51] Int. Cl........................................................B65b 11/48,
B65b 53/02, B65b 61/00
[50] Field of Search............................................ 53/33, 30,
137, 184, 14, 3, 232–234, 209, 225, 198

[56] References Cited
UNITED STATES PATENTS

| | | | |
|---|---|---|---|
| 3,402,475 | 9/1968 | Johansen et al. | 53/30 X |
| 2,368,213 | 1/1945 | Gerlach | 53/137 X |
| 2,590,128 | 3/1952 | Sandberg | 53/234 X |
| 2,749,692 | 6/1956 | Conti | 53/234 |
| 3,056,246 | 10/1962 | Lyon et al. | 53/234 X |
| 3,225,891 | 12/1965 | Hickin et al. | 53/164 X |
| 3,257,769 | 6/1966 | Ford | 53/184 X |
| 3,295,290 | 1/1967 | Billingsley et al. | 53/30 X |
| 3,527,014 | 9/1970 | Wahle et al. | 53/234 X |

*Primary Examiner*—Theron E. Condon
*Assistant Examiner*—Neil Abrams
*Attorneys*—Fredrick H. Braun and John V. Gorman

ABSTRACT: A machine and method for packaging cylindrical articles in multiples of two, preferably a single pair, in which the articles are delivered by an infeed conveyor section to a banding section which contains a banding drum. A length of heat shrinkable plastic film is cut and placed on the banding drum whereupon the articles are picked up in pairs and deposited on the cut film blank at a radially movable platform mounted in the banding drum. The free ends of the film are folded partially around the articles by a pair of tucker arms coacting with the platform. As the drum rotates, a vacuum lift arm and a wing section coact to lap the ends of the cut film blank which then encircles the articles. A reciprocating heat sealer movable tangentially to the banding drum engages the lapped end portions of the film to form a seal and an encircling band around the articles. The banded articles are then deposited on a conveyor which moves them to heat shrink section in which the large upper and lower areas as well as selected side portions of the banded articles are shielded as they are moved through a heat shrink tunnel. This causes the extended sides of the band to shrink down against the end surfaces of the articles while simultaneously making the band snug around the articles. The banded articles are then delivered to an end panel cutting and sealing section at which suitable end panels are die cut and heat sealed to at least one and preferably both ends of the banded articles in order to complete the formation of the package.

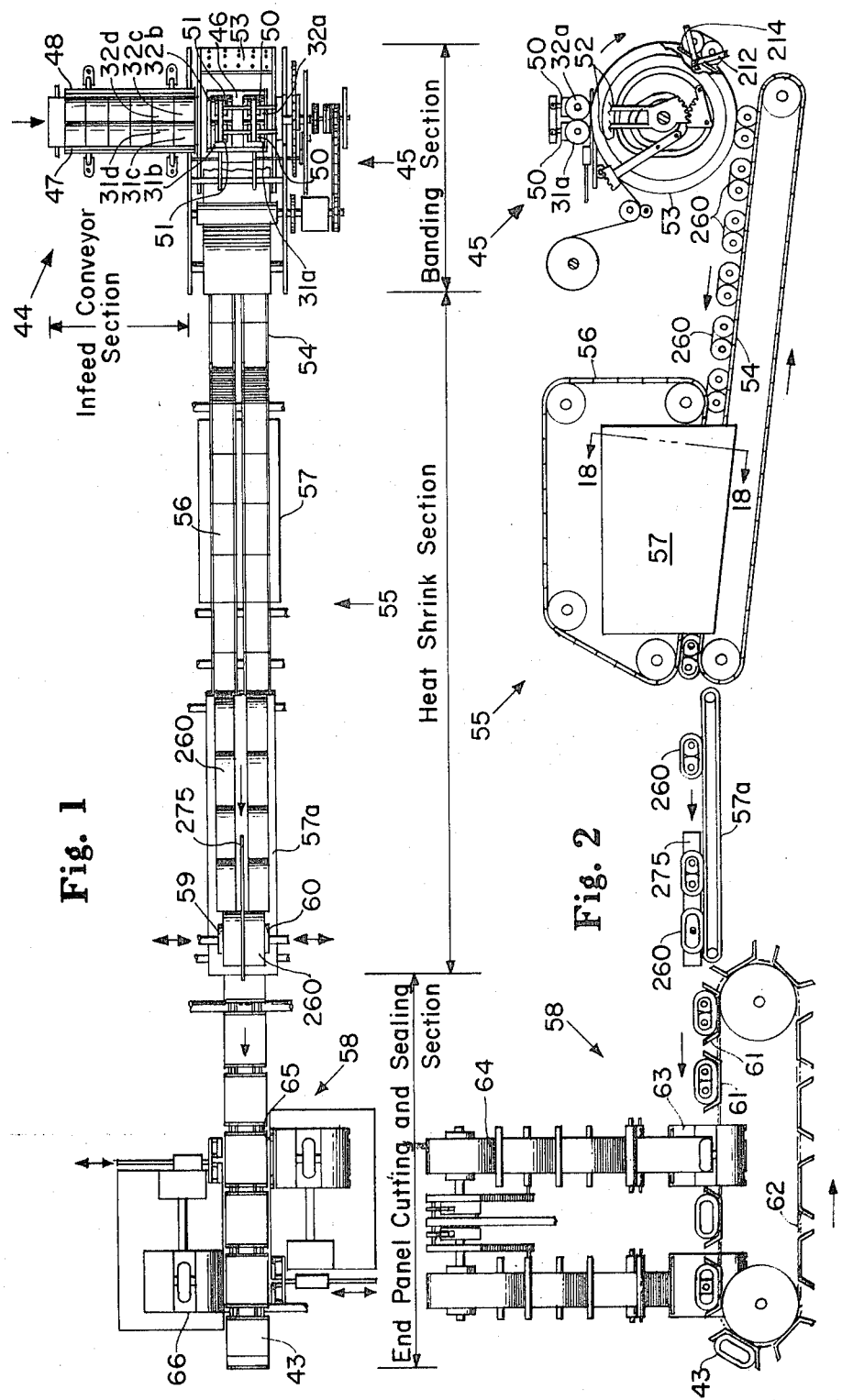

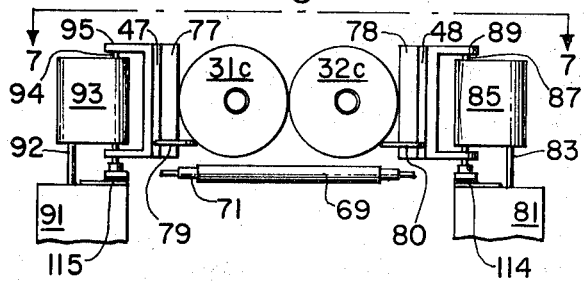
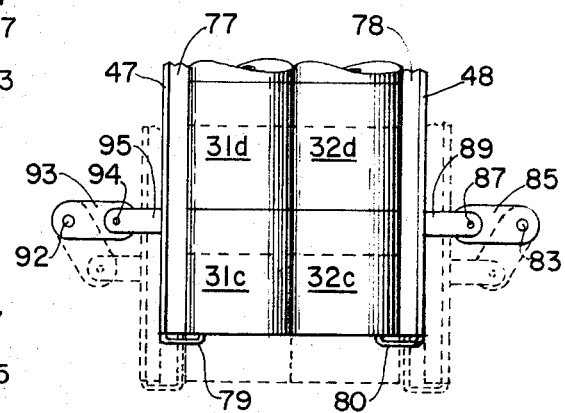
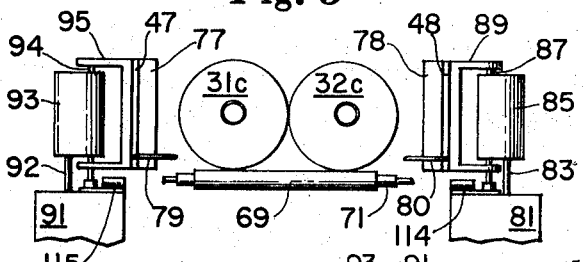
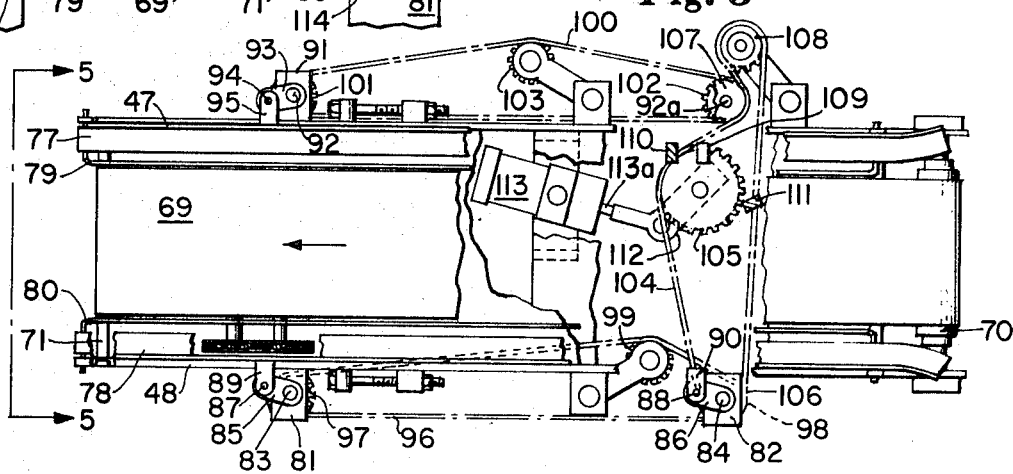
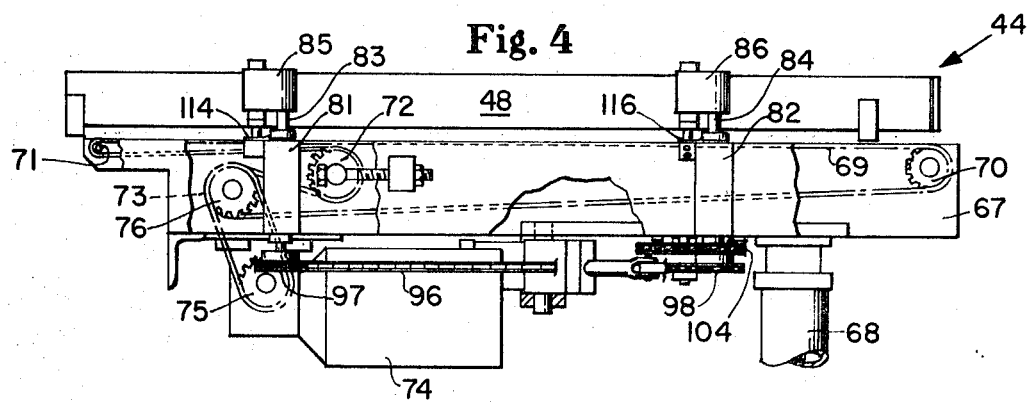

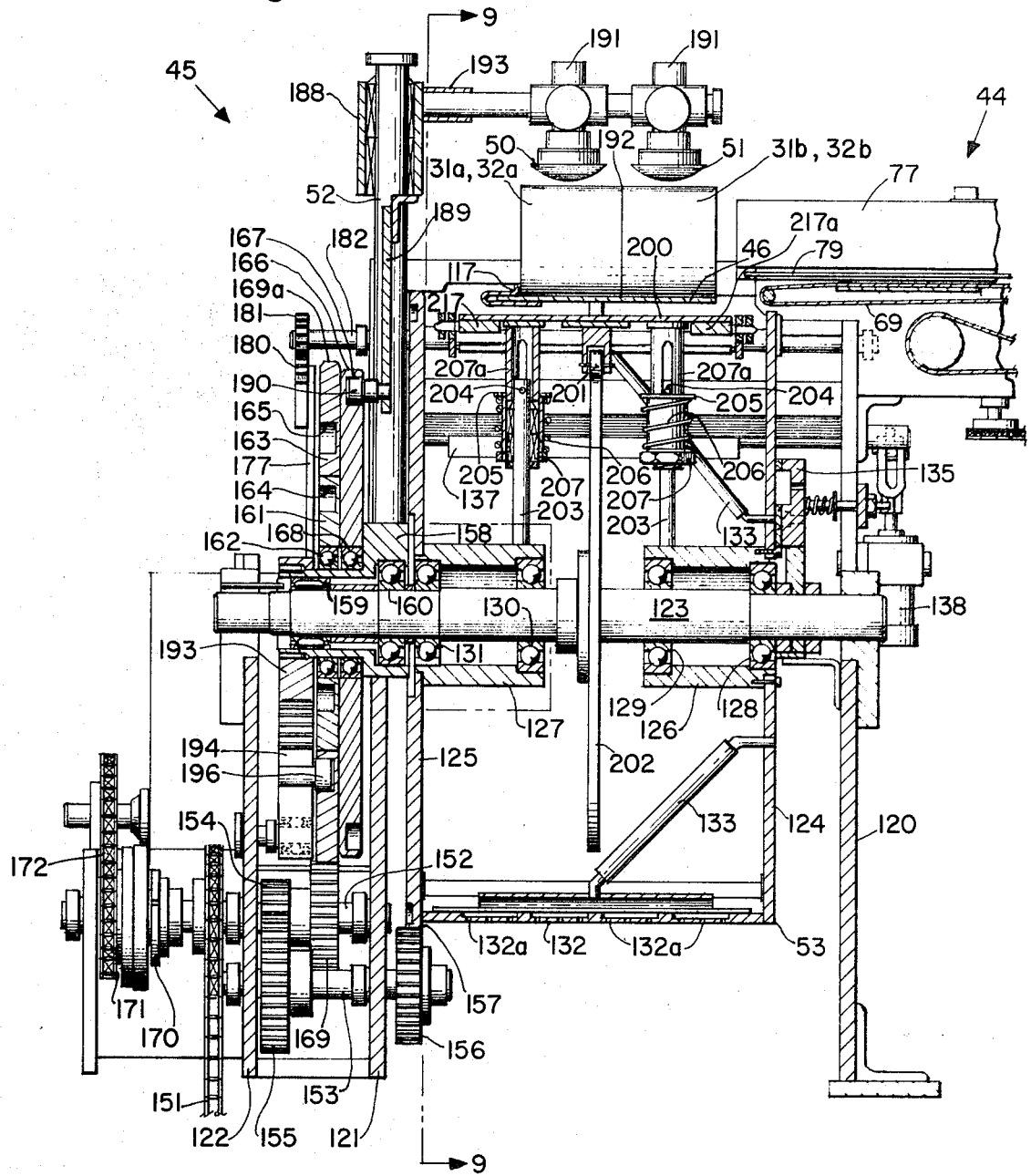

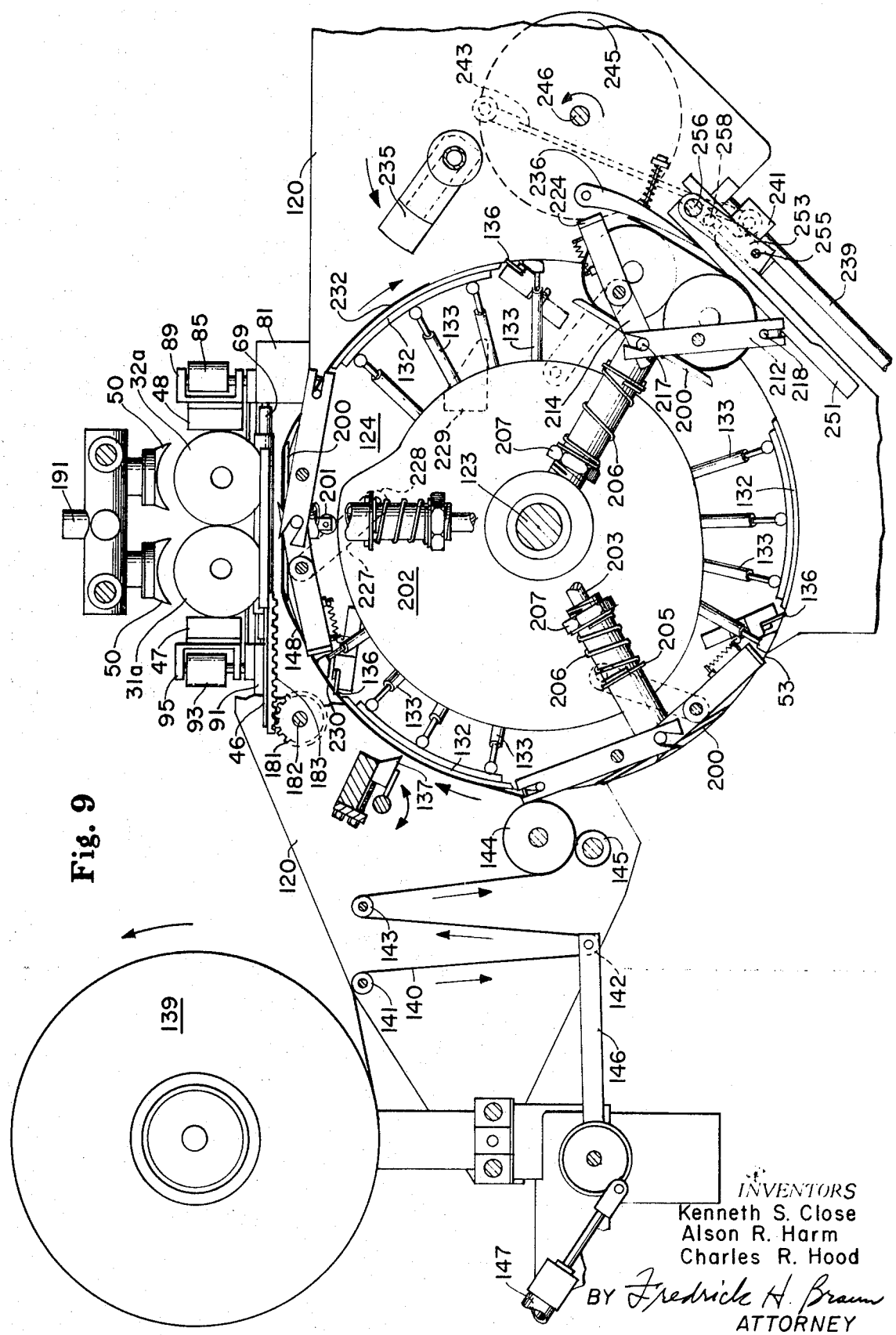

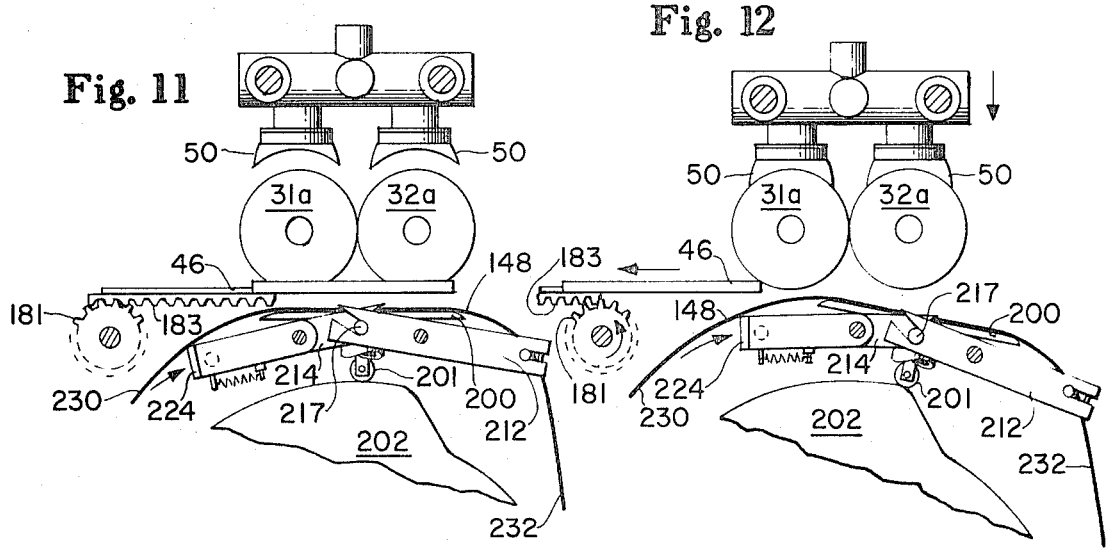
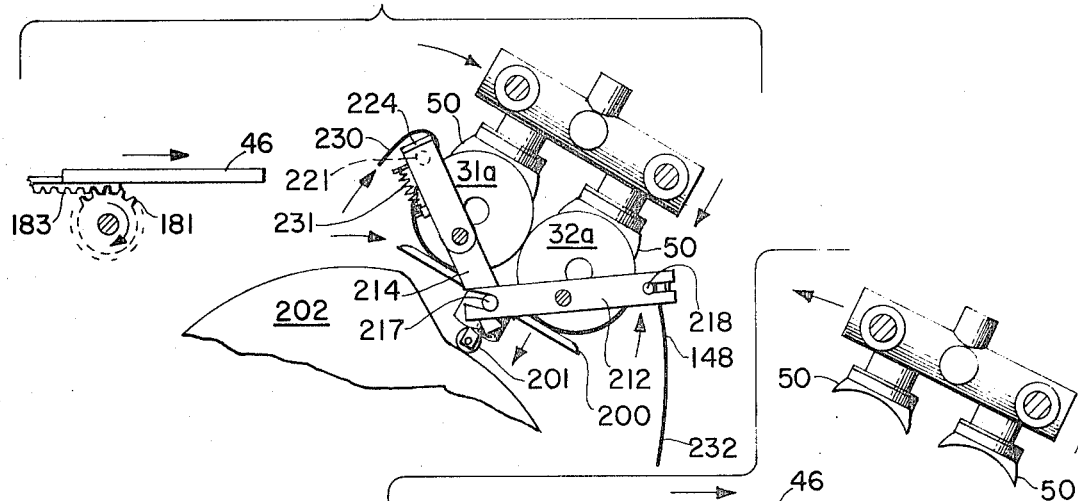
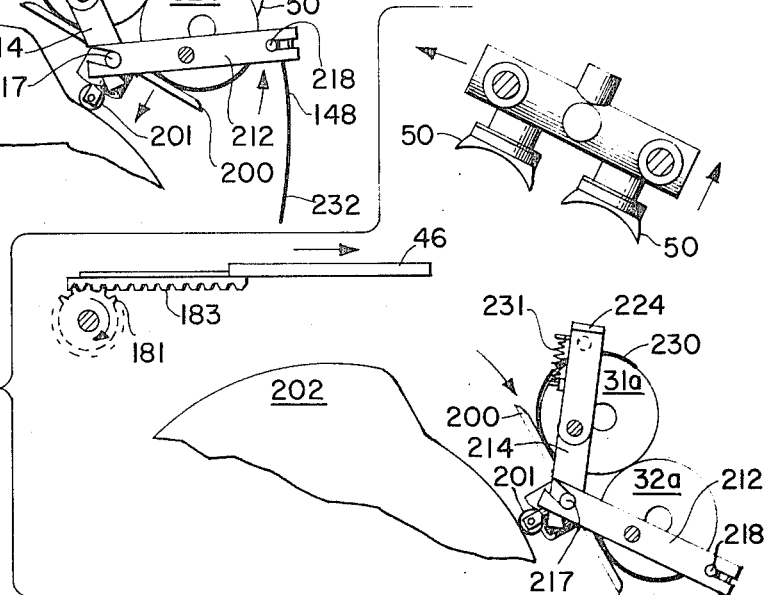

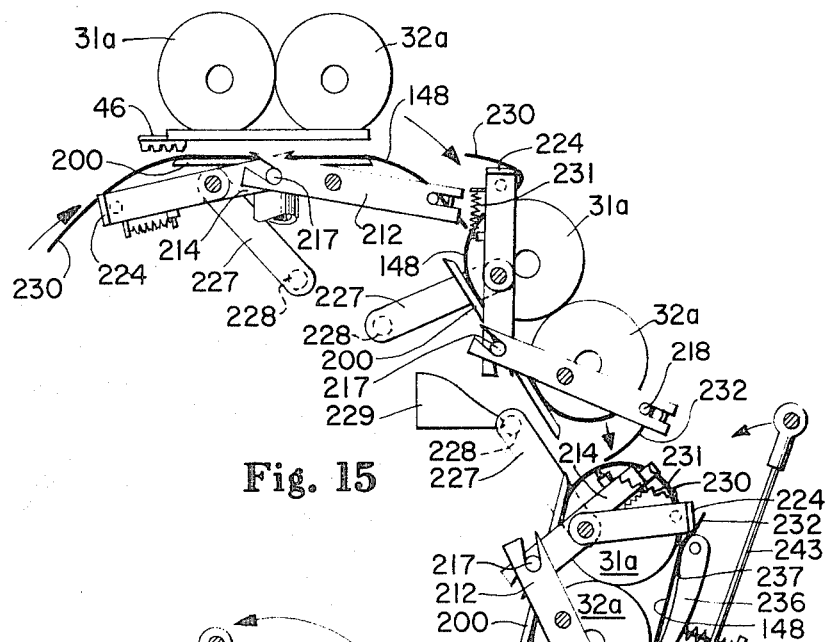
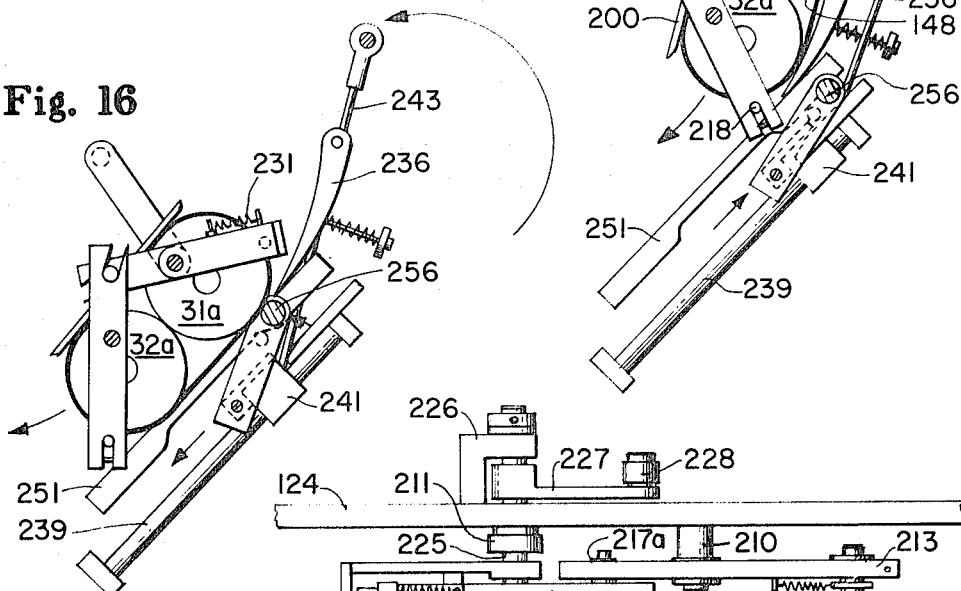
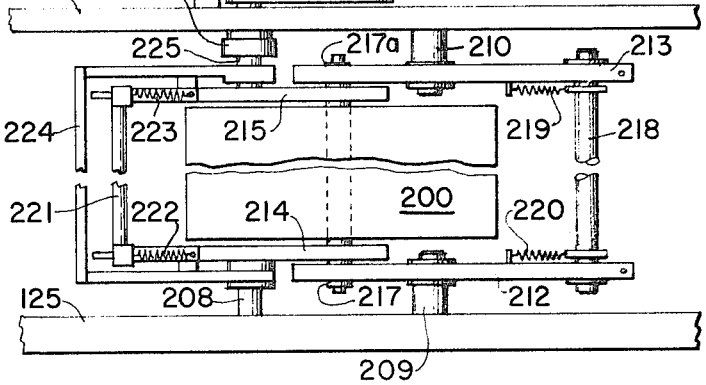

INVENTORS
Kenneth S. Close
Alson R. Harm
Charles R. Hood

BY Fredrick H. Brown
ATTORNEY

MACHINE AND METHOD FOR PACKAGING A PLURALITY OF CYLINDRICAL ARTICLES

CROSS-REFERENCE TO RELATED APPLICATIONS

The inventive concept involves the provision of a machine and method which has as a primary objective the capability of making a package for toilet tissue rolls as described and claimed in U.S. Pat. 3,460,671, issued to Alson Robert Harm on Aug. 12, 1969 entitled PACKAGE FOR CYLINDRICAL ARTICLES OR OBJECTS, said patent being commonly owned by the assignee of the present invention. In a generic sense, the machine and method has the ability to form a banded package with end panels around pairs of cylindrical articles which preferably are toilet tissue rolls although it is not limited to that product or that number of rolls. The invention has equal capability of making banded packages composed of pairs of absorptive hand toweling rolls which are generally longer and slightly larger in diameter. It is also capable of making packages from four, six, eight or any even number of cylindrical roll products. In the broadest sense, the roll products can be any cylindrical object or any object for that matter, regardless of its peripheral geometry which is capable of being formed into a package of the general type made by the present machine and method. In a preferred sense and for the sake of simplicity, however, the invention will be described in its preferred form for making packages consisting of two toilet tissue rolls arranged in side-by-side relation such that their cores are parallel and their ends are essentially in two spaced parallel planes. When rolls of toilet tissue are referred to herein, it will be understood that it is for the sake of explanation and does not in any way place a limitation on the scope of the invention.

BACKGROUND OF THE INVENTION

The present invention is in the field of packaging machines and methods, and more particularly it relates to a machine and method that has been especially developed for the manufacture of a particular banded package of the type described in the previously cited patent of Alson Robert Harm. The machine and method are designed to act continuously and sequentially to move a pair of cylindrical articles, i.e., toilet tissue rolls, from an input conveyor through a series of manipulative packaging steps whereupon they are ultimately discharged as a fully completed package. A survey of available equipment in the commercial market indicated to these patentees that a machine of this character for producing this particular type of package was not readily available. While perhaps a few isolated components were known in the art and had been suggested, the combination of elements and devices in the particular arrangement to be hereinafter described had never been previously contemplated.

A discussion or description of the prior art would, therefore, not be particularly relevant or appropos at this juncture since the survey conducted by the applicants indicated a lack of literature directed to machines and methods of this character. From the following description, it will become apparent that the machine and method contemplated by these applicants constitutes an entirely new approach to the formation of the type of package made by their invention.

SUMMARY OF THE INVENTION

The nature and substance of the invention will be more readily appreciated after giving consideration to its major objectives which are listed for convenience in the ensuing paragraphs.

A major object of the invention is the provision of a machine and method for overwrapping cylindrical objects in pairs with a band of shrinkable plastic film thereafter shrinking the projecting edges of the film to form a snug band around the cylindrical objects having its ends folded down against the planar surfaces of the objects whereupon end panels are cut and sealed to at least one end of the banded package to provide a closed end for the finished package.

Another object of the invention is the provision of a machine and method of this character which permits the use of very thin flexible plastic films having heat shrinkable characteristics to be handled effectively at high operating speeds in order that the machine will be commercially feasible. That is, the invention is capable of operation such that it produces a sufficient number of packages per minute in order to make it an economically feasible device.

Still another object of the invention is the provision of a machine and method of the above character which produces a unique package having a neat appearance. In fact, the package is made so that in its finished form it has no unsightly and undesirable folds and yet provides a maximum of available area for the placement of advertising and instructional copy.

Still a further object of the invention is the provision of a machine and method capable of making a package of the character described heretofore such that the package itself is economically feasible because it uses a minimum of material in order to accomplish its objectives and provide a sound protective wrapping for the articles being packaged.

These and other objects are achieved by providing a combination of means in a machine and a succession of manipulative steps in a method which basically includes three principal sections for performing the specific functions of first placing a band around a pair of rolls; thereafter shrinking down the projecting ends of the band; and, then cutting and sealing end panels onto the flat end surfaces of the package.

In the first section of the machine, rolls of toilet tissue are delivered in pairs and deposited upon a retractable deadplate whereupon they are picked up by vacuum cups and circumferentially accelerated over the periphery of a banding drum. A web of heat-shrinkable wrapping material is fed onto the periphery of the banding drum, is cut into suitable wrapping sheet lengths, and is carried therewith by an internal vacuum device. The rolls are deposited on the wrapping sheet whereupon the ends of the latter are folded around the rolls and then lapped ans seamed to complete the band.

The banded rolls are deposited upon a conveyor which carries them through a heat shrink tunnel while the body of the package is largely protected in order to cause selective shrinking of the projected ends of the band. These ends are literally shrunk down against the end surfaces of the toilet tissue rolls. The banded rolls are then deposited in a bucket conveyor whereupon they are intermittently conveyed to one or more end panel turrets, the latter being designed to cut an end panel from a continuous roll of plastic packaging material and then heat seal it to the open end of the package. The completed package is thereupon deposited upon a suitable conveyor to be moved to a subsequent station for further processing and handling.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

FIG. 1 is an overall plan view of the entire machine showing the major elements of each of the several sections thereof.

FIG. 2 is a side elevation similar to FIG. 1 which illustrates each of the major components of the several sections of the machine.

FIG. 3 is a fragmentary plan view illustrating the infeed conveyor and the major functional components of the clamping jaws associated therewith.

FIG. 4 is an elevation of the conveyor of FIG. 3 which has been partially fragmented to better illustrate some of the major operating components thereof.

FIG. 5 is a fragmentary end elevation of the infeed conveyor taken on the line 5—5 of FIG. 3 and showing the clamping jaws in open position.

FIG. 6 is a fragmentary end elevation similar to FIG. 5 illustrating the closed position of the clamping jaws of the infeed conveyor.

FIG. 7 is a fragmentary plan view of the forward end of the infeed conveyor taken on the line 7—7 of FIG. 6.

FIG. 8 is a fragmentary end elevation in cross section of the banding apparatus portion of the machine illustrating the major operating components thereof, the cross section being taken on the line 8—8 of FIG. 10.

FIG. 9 is a fragmentary side elevation in cross section of the banding section of the apparatus illustrating some of the major components thereof including the film unwind section, the cross section is taken on the line 9—9 of FIG. 8.

FIGS. 11, 12, 13 and 14 are sequential fragmentary schematic illustrations of the components of the banding drum which act upon the tissue rolls to transfer them from their initial position on the deadplate to a subsequent position on the bucket carrier where they are secured and partially wrapped and subsequently conveyed through the remaining banding steps.

FIG. 15 is a fragmentary elevation schematically illustrating the sequence of operating positions of the bucket carrier and tucker bars in folding the banding film around a pair of rolls.

FIG. 16 is a fragmentary elevation schematically illustrating the sealer portion of the banding section as it initiates the formation of a transverse heat seal which completes the band.

FIG. 17 is a fragmentary plan view illustrating the several elements comprising the tucker bars which coact with the bucket carrier for holding the rolls in pairs as the film is formed therearound and subsequently sealed to complete the formation of the band.

FIG. 24 illustrates the banded package with the projecting ends shrunk down; and, FIG. 25 illustrates the completed package with the end panel sealed in place.

Package Made By The Machine

As previously indicated, the present machine and method was invented for making a package of the kind generally disclosed and claimed in the patent of Alson Robert Harm, previously cited. The machine is particularly suited to making a preferred form of the package (FIGS. 23, 24 and 25) in which a pair of toilet tissue rolls 31 and 32 are placed in side-by-side relation with their cores parallel and their end faces in two spaced parallel planes.

Figure 23:
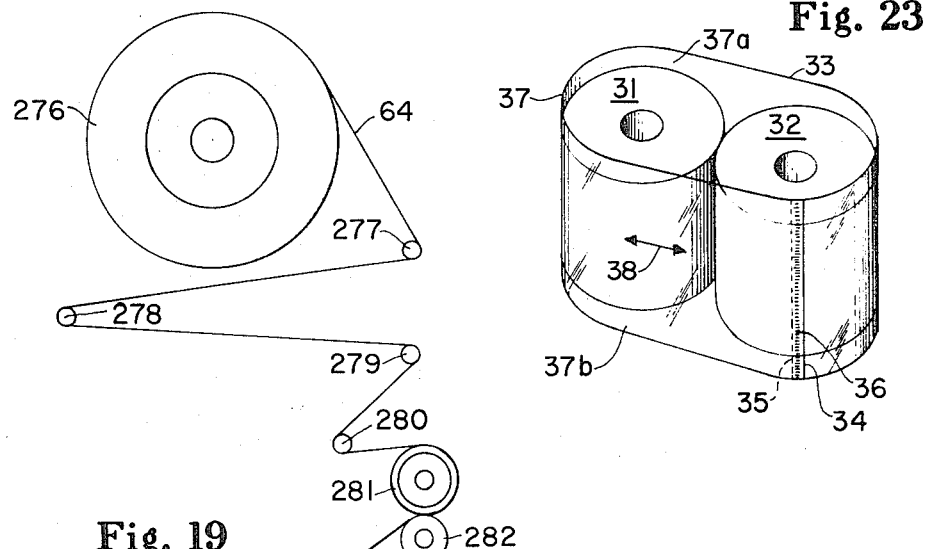
FIGS. 23, 24 and 25 are each perspective views illustrating the package formed by the machine and method of the invention in various stages such that FIG. 23 shows the banded package.

FIG. 23 illustrates a heat shrinkable plastic film 33 placed around the rolls 31 and 32 such that the ends 34 and 35 are overlapped to permit the formation of a transverse seal at 36. It will be noted that the band 37 is formed of a width which allows the edges 37a and 37b to protrude at either end of the flat end faces of the rolls 31 and 32. In a preferred form, the grain orientation in the film 33 is in the direction illustrated by the arrow 38.

Figure 24:
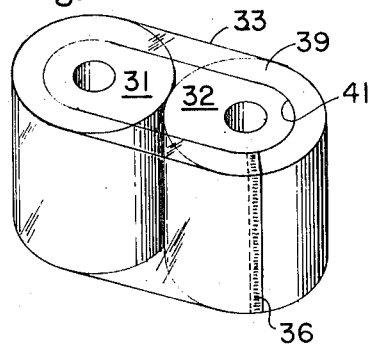

FIG. 24 illustrates the next step in the formation of the package. The protruding ends 37a and 37b are subjected to heat. This causes the protruding ends 37a and 37b to be shrunk downwardly as at 39, it being apparent that the same action will occur at the bottom surface of the package to complete the shrinking process. Shrinkage of the band 37 is limited to certain predetermined areas by providing heat shields to protect the areas that are to remain substantially unshrunk.

Figure 25:
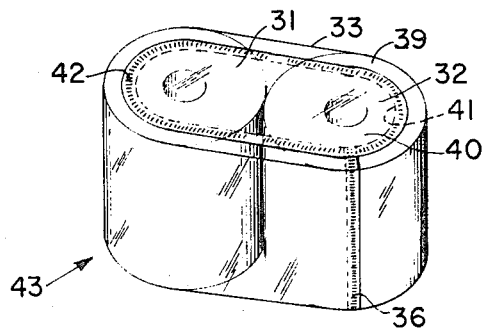

As illustrated in FIG. 25, the package is completed by the provision of an end panel 40 which overlaps the edge 41 of the shrunk down flange 39 shown also in FIG. 24. The overlapped portion is sealed as at 42 to complete one end of the package, the other end being similarly completed to form the finished package 43. While the seam 42 is illustrated as being continuous, in practice it may have a gap at each side where the panel 40 is unsupported by rolls 31 and 32 when making the heat seal.

The package is capable of formation from virtually any kind of flexible wrapping material, including various papers, foils, papers coated with any of a variety of heat sealable films, plastic wrapping films such as polyethylene, polypropylene, etc. In the preferred form, however, the package is made from a heat shrinkable plastic film that is biaxially oriented. While it has been found that best results are achieved with biaxially oriented heat shrinkable plastic films, unidirectionally oriented films may also be used with results that are nearly as satisfactory although small wrinkles and fold may occur in the finished package with the latter type of material. In fact, nonshrinking films can also be used, but in that case there is some difficulty in folding down the ends 39 as in FIG. 24 due to the geometry of the package.

Thus in a preferred practice of the invention, a thin, low density, heat shrinkable biaxially oriented polyethylene wrapping film is used for the band 37 and the end panels 40. The direction of grain orientation in the band 37 in one direction necessarily is parallel to the end surfaces of the rolls 31 and 32 as shown by the arrow 38 in FIG. 23. The use of heat sealable material permits joining the ends of the band 37 by means of a heat seal at 36. It also makes possible the attachment of the end panel 40 by heat sealing.

General Machine Arrangement

Before describing the detailed construction of the machine, it is believed that a general discussion of its construction would be desirable at this point so that the more detailed structure will subsequently be more readily understood. For convenience, the machine is divided into a number of operating sections which act successively and continuously on pairs of rolls 31 and 32 at relatively high speeds in order to ultimately form a finished package 43.

Referring now to FIGS. 1 and 2, the machine comprises an infeed conveyor section 44 which automatically gates and feeds the proper number of rolls into the machine so that the banding cycle can begin in the banding section 45. The supply of rolls 31a, 31b, 31c, etc., and 32a, 32b, 32c, etc., is received from a continuously moving conveyor carrying them from a conventional log cutter to the packaging machine. There are two rows of rolls, their cores in line. The rolls arrive in the vicinity of the wrapper in a random fashion, and in random numbers. The infeed conveyor section 44 responds at one end to the rolls arriving, determining that there is a certain minimum number of rolls, and at the other end to the timing of the banding section 45. The infeed conveyor section deposits two pairs of rolls on the dead plate 46 whereupon the remaining rolls in the infeed conveyor section 44 are clamped by the jaws 47 and 48 and withdrawn by a mechanism to be hereinafter described.

The roll pairs 31a, 32a and 31b and 32b are picked up by the pairs of vacuum cups 50 and 51 whereupon the dead plate 46 is retracted to the left as viewed in FIGS. 1 and 2. The rolls are angularly accelerated to the right by the carriage arms 52 whereupon they are deposited upon a radially movable platform (not shown in FIGS. 1 and 2) associated with the banding drum 53 where they are held in place by the tucker arms 212 and 214. A length of wrapping material is cut and deposited on the banding drum 53 so that it is interposed between the pair of rolls and the movable platform when the rolls are deposited thereon. The wrapping material is formed around the rolls and heat sealed whereupon the partially completed package is deposited on the conveyor 54 for transmittal through the heat shrink section 55.

The coacting protective belt 56 together with the conveyor 54 shield the major portions of the banded package as it moves through the shrink tunnel 57 in order that the projecting ends 37a and 37b of the band are shrunk down in the fashion illustrated in FIG. 24. The partially completed banded packages are then deposited on the conveyor 57a whereupon they are conveyed to the end panel cutting and sealing section 58.

The banded packages are released alternately from the conveyor 57a by means of the clamps 59 and 60 such that one banded package is placed in each of the buckets 61 forming part of the conveyor 62. This last section consists of a first indexing drum 63 which receives a supply of film 64, the latter being cut into successive end panels 40 (FIG. 25). The end panels 40 are held in place by vacuum as the indexing drum 63 is turned intermittently until it arrives in position opposite the open end of the banded package whereupon a heat sealer 65 moves forward to heat seal the end panel to the banded rolls. An essentially similar arrangement is used for the other end panel which is affixed by the indexing drum 66 in essentially similar fashion in order to finish the package 43 which is thereupon discharged from the machine.

DETAILED DESCRIPTION OF THE PREFERRED EMBODIMENT

The remainder of the specification will be devoted to a detailed description of each of the major components of the complete machine. As previously indicated, these consist of the infeed conveyor section 44, the banding section 45, the heat shrink section 55 and the end panel cutting and sealing section 58. For convenience of reference and to minimize, and hopefully eliminate, any misunderstanding, it is believed that a description broken down in this fashion will facilitate a better and complete comprehension of the detailed aspects of the machine and method.

Infeed Conveyor Section

The infeed conveyor section which has been briefly described and is generally indicated at 44 in FIG. 1 is shown in greater detail in FIGS. 3 through 7 of the drawings. The infeed conveyor section acts not only as a device for maintaining a supply of rolls to the wrapping machine but it also includes a stop device which clamps the rolls on the conveyor, lifts and withdraws them after the proper number of rolls have been delivered to the banding section 45. The details of the mechanism for accomplishing this will now be described.

Referring to FIGS. 3 and 4, it will be noted that the conveyor comprises a frame 67 suitably secured to a support 68 and having a conveyor belt 69 supported by the pulleys 70 and 71 there being a tensioning pulley 72 and a drive pulley 73 mounted in conventional fashion. The conveyor belt 69 is operated continuously by the gear motor 74 through a chain drive by the sprockets 75 and 76, the latter sprocket being commonly mounted on the drive shaft for the drive pulley 73. As a consequence of the continuous movement of the conveyor belt 69, the pairs of rolls 31a–32a, 31b–32b, 31c–32c, etc., illustrated in FIG. 1, tend to be driven continuously toward the banding section 45 of the machine.

The infeed conveyor section 44 includes a holding device which is designed to clamp the residual rolls and raise them above the belt 69. In the course of clamping and raising, the rolls are also moved rearwardly to avoid any interference with the operation of the banding section 45. The mechanism for achieving these movements includes the clamp jaws 47 and 48 on either side of the belt 69 as illustrated in FIGS. 3, 5, 6 and 7. The clamp jaws 47 and 48 are covered with a sponge lining 77 and 78, respectively, in order that the tissue rolls will not be damaged by the clamping action. In addition, a lower projecting support member 79 and 80 is mounted on the clamp jaws 47 and 48, respectively, in order to assist in the lifting of the tissue rolls from the conveyor belt 69.

The clamp-actuating mechanism comprises on one side a pair of blocks 81 and 82 (FIG. 3) mounted on the frame 67, there being shafts 83 and 84, respectively, journaled therein. Actuating arms 85 and 86 are secured to the shafts 83 and 84, respectively, and are journaled on the pins 87 and 88 which in turn are mounted for free rotation in the brackets 89 and 90. The brackets 89 and 90 are each secured to the side of the clamp jaw 48.

An equivalent mechanism is provided for the clamp jaw 47 although only one end is shown in FIG. 3. It consists similarly of a block 91, a journaled shaft 92, and actuating arm 93, and a pin 94 journaled in the bracket 95. The latter is secured to the clamp jaw 47 and it will be understood that a similar mechanism (not shown except for the journaled shaft 92a) is also attached to the rear portion of the clamp jaw 47 in order to provide matching actuating mechanisms as in the case of the clamp jaw 48. An actuating chain 96 (FIGS. 3 and 4) engages the sprockets 97, 98 and the idler sprocket 99. The sprockets 97 and 98 are secured to the shafts 83 and 84, respectively. Similarly, a second actuating chain 100 is provided which engages the drive sprockets 101 and 102 and the idler sprocket 103. The sprockets 101 and 102 are secured, respectively, to the shafts 92 and 92a.

The drive for the chains 96 and 100 is provided from the chain 104 which engages the drive sprocket 105 there being a sprocket 106 mounted on the shaft 84 and a sprocket 107 mounted on the shaft 92a. Idler sprocket 108 is provided for the adjustment of chain tension. Sprocket 105 is provided with a stop 109 (FIG. 3) to limit its arc of movement between the fixed stops 110 and 111, the latter being secured to the frame 67 of the conveyor. Oscillating movement of the sprocket 105 is provided from the lever 112 which in turn is actuated by the cylinder 113. The stroke of the piston rod 113a projecting from the cylinder 113 moves the sprocket 105 through a predetermined arc. This causes the chain 104 to move a predetermined distance in either direction depending upon the direction of movement of the piston rod 113a. It will be noted in FIG. 3 that counterclockwise movement of sprocket 105 will cause similar counterclockwise movement of the chain 96 and clockwise movement of the chain 100. On reversal of the movement of sprocket 105, the chains 96 and 100 will counterrotate in the opposite direction. Thus each of the shafts 83 and 84 will be turned in one direction, whereas the shafts 92 and 92a will be turned in the opposite direction through an equal arc as the sprocket 105 is moved in either direction. As a consequence of this action, when the chains 96 and 100 are actuated by clockwise movement of the sprocket 105, the clamps 47 and 48 will move together and clamp the rolls on the conveyor belt 69 and when the sprocket 105 is rotated counterclockwise, the clamps 47 and 48 will release and deposit the rolls on the belt 69.

A mechanism is also provided for simultaneously causing the clamps 47 and 48 to be raised as they are moved together and similarly to be lowered as they are moved apart to deposit the raised rolls on the conveyor belt 69. This mechanism consists of the provision of an arcuate cam or ramp beneath each of the pins 87, 88, and 94 as well as beneath the pin that is not illustrated but that would be associated with the shaft 92a. The forward ramps 114 and 115 are illustrated in each of FIGS. 5 and 6. The ramps 114 and 116 associated with the clamp 48 are also illustrated in FIG. 4.

Thus it will be noted that there are four ramps (of which, only 114, 115 and 116 are shown on the drawings) which cause the clamps 47 and 48 to be raised in unison when they are moved into clamping engagement by the mechanism previously described. Similarly, the ramps cause the clamps to be lowered as the latter are being opened. It will also be noted that because of the mechanics of the clamping mechanism, that the clamps 47 and 48 are moved rearwardly with respect to the direction of motion of the conveyor belt 69 as the clamping jaws are closed. Thus the clamping jaws have a compound motion which consists of moving inwardly and rearwardly as they clamp and raise the toilet issue rolls held therebetween and moving forwardly and downwardly as the latter are released. FIG. 7 illustrates the relative position of the clamping jaws showing the closed position in solid lines and the open position in dotted lines. It will be appreciated from this illustration that considerable rearward motion is imparted to these jaws as they move from the open to the closed position and it will also be appreciated from viewing FIGS. 5 and 6 that considerable upward and downward motion is imparted to the tissue rolls 31c and 32c by the same mechanism.

FIG. 8 illustrates the mating of the infeed conveyor section 44 with the input to the banding section 45. Two pairs of rolls 31a, 32a and 31b, 32b are shown in position after being deposited on the dead plate 46 there being a switch embedded in the member 117 which actuates the cylinder 113 causing the jaws 47 and 48 to close, pick up the remaining rolls on the conveyor belt 69 and move them rearwardly to prevent interference thereof with the moving elements of the banding section 45 which will be described hereinafter.

Banding Section

Figure 10:
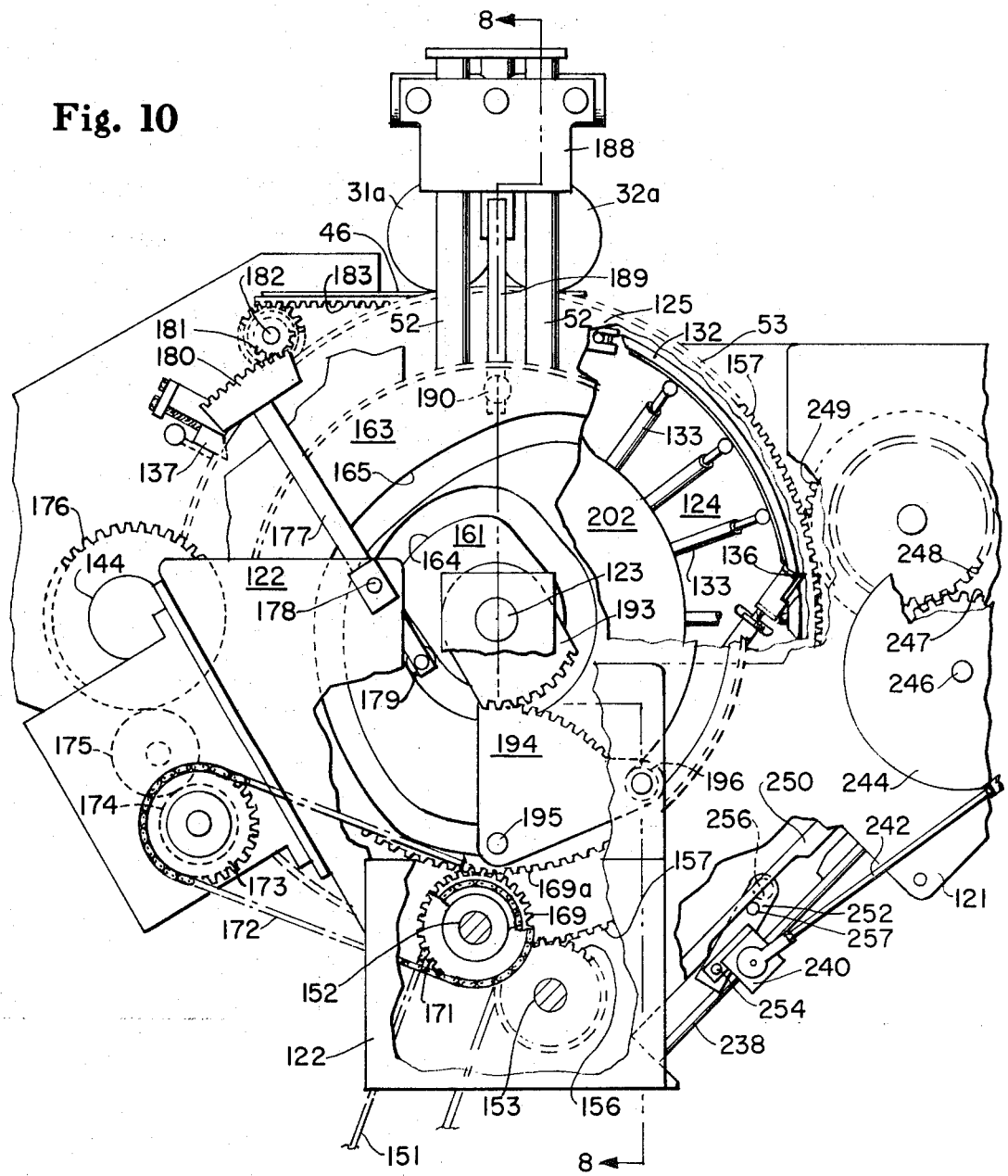
FIG. 10 is a fragmentary side elevation similar to FIG. 9 except that the fragmentation differs such that some of the other major operating components of the banding section are better illustrated.

The most salient features and elements of the banding section 45 are illustrated in great detail in FIGS. 8, 9 and 10. The purpose of this portion of the machine is to cut a length of shrinkable film, place it in wrapping position to receive the rolls in pairs and thereafter wrap the ends of the film around the tissue rolls so that the ends of the wrapper sheet are lapped. A seam is then formed in the lapped area whereupon the banded rolls are discharged from this section of the machine.

As illustrated in FIG. 8, the banding section 45 is supported at its sides by the frame members 120 and 121, there being an outer support member 122 which serves to provide support for the gearing mechanism used to drive the various components of the banding section. A stationary central shaft 123 is supported by the frame member 120 at one end and by the outer support member 122 at the other end.

The banding drum 53 which includes the end plates 124 and 125 is supported for free rotation on the central shaft 123 by means of the housings 126 and 127 which in turn are supported by the bearings 128, 129, 130 and 131. A plurality of vacuum shoes 132 are mounted in spaced relation between the end plates 124 and 125. In the present construction, there are three such vacuum shoes 132 approximately equally spaced around the periphery of the banding drum 53 as best seen in FIG. 9. Each of the vacuum shoes 132 is provided with a plurality of vacuum ducts 133 leasing to the end plate 124 so that they periodically communicate with the vacuum manifold 135 (FIG. 8) as the banding drum 53 is rotated. The face of each vacuum shoe 132 is provided with a plurality of small vacuum inlet apertures 132a (FIG. 8).

Stationary cutting blades 136 (FIG. 9) are substantially equally spaced around the periphery of the banding drum 53 and coact with the bed knife 137 which is pivotally mounted between the frame members 120 and 121 as illustrated in FIGS. 8, 9 and 10. The bed knife 137 is shown in its cutting position in FIG. 9 but it can be retracted, if desired, by actuating the air cylinder 138. This allows the bed knife 137 to be pivoted out of the path of the cutting blades 136 as the banding drum rotates. This can be used to discontinue film cutting during any portion of the operating cycle if desired.

The heat-shrinkable banding material is supplied in the form of a web of plastic on the roll 139 which is suitably supported between the frame members 120 and 121 such that the film 140 is withdrawn over the idler roll 141 around the dancer roll 142 then up over the idler roll 143 and down between the measuring roll 144 and the nip roll 145. Proper tension on the film 140 is maintained by the dancer roll 142 which is controlled by the arm 146 in response to the air cylinder 147.

From the above it will be apparent by reference to FIG. 9 (in which the banding drum 53 is rotating clockwise) that when the bed knife 137 is in its cutting position, the film will be severed just forward of a vacuum shoe 132. The cut length 148 is held by the vacuum shoe 132 under the influence of the vacuum manifold 135 as the banding drum 53 rotates. The length of cut film 148 is determined by the amount of film fed out between the measuring roll 144 and the nip roll 145 as the leading end tends to slip on the surface of the banding drum 53. The next length 148 of cut film is then severed when the next successive cut is made by the following cutting blade 136 as it strikes the bed knife 137. When this occurs, it will be noted that the length of cut film 148 is initially beneath the dead plate 46 and is in position to receive a pair of tissue rolls for initiation of the banding process.

Referring again to FIGS. 8 and 9, the mechanism for actuating the dead plate 46 and the vacuum cups 50 and 51 will now be described as well as the mechanism for driving the banding drum 53. The entire banding section 45 is driven from the chain 151 (see also FIG. 10) from a suitable motive power source in order to rotate the drive shaft 152. The shaft 153 is driven from the drive shaft 152 by means of the gears 154 and 155 such that the output gear 156 drives a ring gear 157 secured to the periphery of the end plate 125. This latter power train normally drives the banding drum 53 at substantially constant rotative speed.

A torque tube 158 is mounted for free rotation by means of the bearings 159 and 160 upon the central shaft 123. A sector cam 161 is mounted for free rotation on the torque tube 158 by means of the bearing 162. A carriage gear cam 163 is mounted concentrically with and outwardly of the sector cam 161. As illustrated in FIG. 10, the sector cam 161 has a cam track 164 on its outer face, and the carriage gear cam 163 has a cam track 165 on its outer face. Mounted inwardly of the cams 161 and 163 is the carriage arm cam 166 having a cam track 167 on its inner face. The carriage arm cam 166 is mounted for free rotation on the torque tube 158 by means of the bearing 168. The cams 161, 163 and 166 are normally fastened together during operation although they are provided with means to allow circumferential adjustment of each of the cams with respect to the others. Thus the cams normally rotate in unison and are driven from the drive shaft 152 by means of the gear 169 which engages the gear teeth 169a on the periphery of the carriage gear cam 163.

As best illustrated in FIGS. 8 and 10, the drive shaft 152 has a clutch mounted at 170 which, when engaged, drives the sprocket 171 by means of which the chain 172 drives the sprocket 173 which is mounted on a common shaft with the gear 174. The gear train 174, 175 and 176 is provided as a drive for the measuring roll 144 so that it can be driven in unison with the other elements of the machine.

The means for retracting the dead plate 46 will now be described. An arm 177 is pivoted to the outer support member 122 at 178 as illustrated in FIG. 10. The lower end of the arm 177 has a cam follower 179 riding in the track 164 of the sector cam 161. The outer end of arm 177 has a sector gear 180 which engages a pinion 181 mounted on shaft 182 which rotates freely between the frame members 120 and 121. The pinion 181 engages the rack 183 mounted on the lower portion of the dead plate 46. With this mechanism it will be seen that rotation of the sector cam 161 causes the arm 177 to oscillate about the pivot 178 thereby actuating the pinion 181 causing the dead plate 46 to be retracted and returned at the appropriate time in the cycle.

The means for picking up the tissue rolls will now be described. As previously indicated, the pairs of vacuum cups 50 and 51 are designed to pick up the tissue rolls from the dead plate 46. The pairs of vacuum cups 50 and 51 are supported from the torque tube 158 (see FIG. 8) by means of the carriage arms 52 there being a bracket 188 which is radially slidable thereon. The bracket 188 is in turn supported from the arm 189 from which projects the cam follower 190 which engages the cam track 167 in the carriage arm cam 166. From this it will be seen that the radial position of the pairs of vacuum cups 50 and 51 with respect to the central shaft 123 is controlled by the position of the cam follower 190 in the track 167 which varies as the carriage arm cam 166 is rotated.

The pairs of vacuum cups 50 and 51 are evacuated from the manifold 191 which in turn is connected to a suitable vacuum source so that the cups have sufficient force to pick up the tissue rolls from the dead plate 46. It will be noted in FIG. 8 that the two pairs of rolls, 31a–32a and 31b–32b, are touching as at 192. Such a position would be satisfactory when a package containing four rolls of toilet tissue is to be banded. However, when making the more preferred two roll package, the pairs of vacuum cups 50 and 51 must be separated prior to the initiation of the banding operation. In order to accomplish this an air cylinder 193 is provided to cause the first pair of vacuum cups 50 to be moved away from the second pair of vacuum cups 51 after the toilet tissue rolls have been picked up.

To further facilitate the formation of two banded packages simultaneously, a slitting knife (not shown) is provided to slit the film 140 just prior to its passage over the measuring roll 144 as it is being continuously delivered from the roll 139. This, each of the pairs of tissue rolls supported on the dead plate 46 can be separately banded as they move through the banding section 45 of the machine.

Means are also provided for causing the carriage arms 52 to oscillate angularly in order to accelerate the tissue rolls picked up by the pairs of vacuum cups 50 and 51 and place them upon the banding drum 53 at approximately matched speed. The mechanism for accomplishing this is best illustrated in FIGS. 8 and 10. It includes a central sector gear 193 pinned to the torque tube 158 and driven by the driving sector gear 194. The driving sector gear 194 is pivoted at 195 to the outer support member 122. The cam follower 196 extending from the driving sector gear 194 rides in the cam track 165 of the carriage gear cam 163. As a consequence of the mechanism just described, it will be apparent that the driving sector gear 194 will turn around the pivot 195 in response to the movement of the cam follower 196 following the cam track 165 as the carriage gear cam 163 is turned. This causes the central sector gear 193 to periodically turn through a limited arc and this motion is transmitted by means of the torque tube 158 to the carriage arms 52. As a consequence, the pairs of vacuum cups 50 and 51 will travel through a limited arc from their vertical position as illustrated in FIGS. 9 and 10 through the sequence of positions illustrated in FIGS. 11 through 14 inclusive. The latter illustrations will be described in greater detail in connection with the deposition of the rolls upon the platform for carrying the rolls through the further stages of the banding cycle.

Interposed between each of the vacuum shoes 132 is a radially movably platform 200 for receiving the tissue rolls in pairs including a mechanism responsive to movement of the platform for holding the pairs of tissue rolls as the banding operation is completed. The construction of each of the platforms is best understood by making reference to FIGS. 8, 9 and 17 in which it will be seen that each comprises the aforesaid platform 200 having a cam follower 201 mounted thereunder which engages the cam 202. The cam 202 is designed to raise and lower the platform 200 as the banding drum 53 revolves.

The mechanism for causing the follower 201 to be held downwardly against the cam 202 is best illustrated in FIG. 8 and includes bearing slides 203 projecting radially from the housings 126 and 127. A pin 204 passes through the bearing slide 203 to support a washer 205 there being a compression spring 206 bearing on the undersurface of the washer 205.

The lower end of the compression spring 206 bears against a shoulder nut 207 secured to the lower end of housing 207a which is attached to the undersurface of the platform 200. As a consequence, it will be seen that the compression springs 206 cause a downward component of force on the platform 200 in order to keep the follower 201 engaged upon the cam 202. FIG. 9 illustrates the manner in which this affects the radial position of each platform 200 as it is moved by the revolving banding drum 53.

Associated with each of the platforms 200 are tucker bars which engage the wrapping film and cause it to be partially formed around the tissue rolls while simultaneously holding the tissue rolls in place on the platform. This mechanism includes stud shafts 208 and 209 (FIG. 17) secured to the end plate 125 and a stud shaft 210 secured to the end plate 124. It also includes a pivot bearing 211 secured to the end plate 124. A shaft 225 is rotatable in the bearing 211. The tucker arms 212 and 213 pivot on the stud shafts 209 and 210, respectively. Similarly, the tucker arms 214 and 215 pivot about the stud shaft 208 and the shaft 225, respectively. The inner ends of the tucker arms 212, 213, 214 and 215 are slotted in the manner shown in FIG. 9 to receive the pivot pins 217 and 217a which project from either end of the platform 200 in the manner illustrated in FIG. 8.

Interposed at the outer end between the tucker arms 212 and 213 is the tucker bar 218 which is mounted in slots and spring biased radially inwardly by means of the springs 219 and 220. Similarly, the tucker bar 221 is interposed between the tucker arms 214 and 215, is mounted in slots and is spring biased radially inwardly by means of the springs 222 and 223. A secondary tucker 224 mounted beyond the tucker bar 221 is pivoted on the stud shaft 208 and is secured to the shaft 225 which passes through the end plate 124 so that its distal end is secured by a bearing in the bracket 226. A secondary tucker actuating arm 227 is secured to the shaft 225 there being a roller actuator 228 mounted at its extremity.

FIG. 15 best illustrates the sequence of movements of the various elements coacting with the platform 200 in order to secure a pair of rolls after they are placed thereon. It will be noted that when the cam follower 201 moves radially inwardly from the position of FIG. 12 to the position of FIG. 13 that the pivot pins 217 and 217a move radially inwardly with the platform 200. This causes the tucker arms 212 and 213 to pivot counterclockwise and causes the tucker arms 214 and 215 to rotate clockwise so that the tucker bars 218 and 221 engage the peripheral portions of the toilet tissue rolls. As the banding drum 53 continues its rotation, the roller actuator 228 strikes the cam 229, the latter being mounted on the outer surface of the frame member 120 (see also FIG. 9). This causes the secondary tucker actuating arm 227 to be rotated clockwise, as viewed in FIG. 15, thereby bringing the secondary tucker 224 up and around to complete the tucking action on the trailing end 230 of the length of cut film 148 so that it is placed in the position indicated in the lower portion of FIG. 15. Springs 231 are provided to return the secondary tucker 224 to its original position after it passes beyond the cam 229.

The mechanism for folding the leading end 232 of the length of cut film 148 will now be described. The leading end 232 of the film 148 is initially engaged by a vacuum lift arm 235 (FIG. 9) which raises the leading end 232 and removes it from the vacuum shoe 132 so that as the platform 200 is rotated, the leading end 232 tends to envelop the forward portion of the package. A spring loaded wing section 236 is mounted between the frame members 120 and 121 for the purpose of smoothing out the leading end 232 as it moves to the sealing section and causes it to lap the trailing end 230 in the the manner illustrated at 237 in FIG. 15.

The coaction of the several elements prior to formation of the heat seal will now be explained since the details of the various interdependent mechanisms have been described. As the two pairs of tissue rolls are being deposited on the dead plate 46 from the infeed conveyor section 44, the bed knife 137 cooperating with the cutting blades 136 is cutting a length of wrapping film 148 which is carried forward by the vacuum shoe 132 until the next cutting blade 136 engages the bed knife 137. This, it will be noted, causes a length of cut film 148 to span a portion of the periphery of the banding drum 53 between the cutting blades such that the leading end 232 is substantially advanced with respect to the platform 200 as compared to the distance by which the trailing end 230 follows the platform 200 as will be appreciated by examining FIG. 9. It will also be noted from this examination that the length of film spans the platform 200 so that when the pair of tissue rolls is deposited thereon the film is in fact interposed between the tissue rolls and the platform 200.

The tissue roll pairs resting on the dead plate 46 are engaged and raised by the pairs of vacuum cups 50 and 51. They are then separated by the air cylinder 193 so that separate side-by-side banding operations can be carried out. Simultaneously, the dead plate 46 is retracted through the mechanism actuated by the sector cam 161 which causes the arm 177 to pivot and rotate the pinion 181. As the platform 200 moves around to the position illustrated in FIG. 12, the dead plate 46 is being retracted and the carriage arms 52 begin to move circumferentially in response to the action of the driving sector gear 194 which is actuated by the cam follower 196 in the track 165. This motion is, of course, translated to the carriage arms 52 through the central sector gear 93. As a result, the rolls held by the vacuum cups 51 and 52 catch up with the platform 200 as illustrated in FIG. 13.

As the elements continue their clockwise rotation, the rolls are lowered in response to movement of the cam follower 190 in the track 167 whereupon the tucker bars 218 and 221 are actuated to engate the rolls as shown in FIG. 13. This action, it will be noted, causes a partial wrapping of the length of cut film 148.

Continued movement, as shown in FIG. 14, results in disengagement of the pairs of vacuum cups 50 and 51 from the rolls, a raising of the vacuum cups and return to their original position. In the meantime, the dead plate is simultaneously returned to initiate pickup and movement of the next pairs of rolls.

As previously indicated, the platform continues to move to the lowermost position illustrated in FIG. 15 whereupon the secondary tucker 224 is actuated by means of the cam 229 to complete the tucking of the trailing end 230. The leading end 232 of the film length 148 is pickup up by the vacuum lift arm 235 (FIG. 9) and placed in the path of movement of the rolls. The leading end 232 is folded around and smoothed by the wing section 236 so that the ends are lapped as at 237 in FIG. 15.

A reciprocating heat sealing device is provided to make a transverse heat seal at the lap 237 of the shrinkable film. This mechanism includes a slide 238 (FIG. 10) secured to the frame member 121 and a similar slide 239 (FIGS. 9, 15 and 16) secured to the frame member 120. Sliders 240 and 241 are reciprocated by means of the connecting rods 242 and 243 which in turn are driven respectively by the circular cranks 244 and 245 from the common shaft 246 by means of the gear train 247, 248 and 249. The gear 249 is engaged with the ring gear 157 on the end plate 125.

Sealer control cams 250 and 251 are mounted, respectively, on the members 121 and 120. Sealer control arms 252 and 253 are pivoted at 254 and 255, respectively, on the sliders 240 and 241, respectively. The sealer bar 256 is mounted between the sealer control arms 252 and 253 and spans the width of the band or bands to be made. Cam followers 257 and 258 engage the sealer control cams 250 and 251, respectively. The sealer is suitably provided with electrical insulation so that it is capable of making a heat seal.

With the previously described mechanism, when the parts are in the position illustrated in the lower portion of FIG. 15, the sealer 256 is raised from contact with the incoming film to be sealed. Forward and downward movement of the sealer 256 is caused by the rotation of the circular cranks 244 and 245. The cam followers 257 and 258 maintain contact with the control cams 250 and 251, respectively, by means of torsion springs on pivots 254 and 255. Simultaneously the banded tissue rolls are moving beneath the wing section 236 to form the lap at 237 whereupon they move into position beneath the sealer 256 as illustrated in FIG. 16. The sealer 256 is moved essentially tangential to the rotation of the banding drum 53 in unison with the packages to permit the formation of a transverse heat seal while the sealer is in brief contact with the lapped film.

As the rolls of tissue pass beyond the sealer section, the seam is completed and the aforementioned mechanism returns the sealer 256 to its original position (as in FIG. 15) so that it can go through the cycle to form the next successive seal while the previous tissue rolls have completed the banding portion of their packaging cycle. The package has now reached the condition illustrated in FIG. 23 of the drawings in which the band 37 with projecting ends 37a and 37b has been completed by the formation of a transverse seal at 36. On further movement of the platform 200 to the lowermost portion of the banding section 45, the cam 202 causes the platform 200 to be moved radially outwardly simultaneously therewith removing the tucker bars 218 and 221 from engagement with the banded tissue rolls and thereby depositing them upon the conveyor 54 as illustrated in FIG. 2.

It will be seen that the various mechanisms of the banding section operate continuously and each of the several functions is carried out through a complete cycle as the banding drum 53 is constantly rotated. Upon release of the banded package, the platform 200 continues in its path of movement to repeat the banding cycle for another package. The banded package meanwhile is moved forward by the conveyor 54 to the heat shrink section 55 which will now be described in greater detail.

Heat Shrink Section

Referring to FIG. 2 it will be noted that the conveyor 54 moves the banded packages 260 forward to the shrink tunnel 57. Prior to entering the shrink tunnel 57, a protective belt 56 comes into engagement with the banded packages 260 in order to shield the upper areas of the banded package as it moves through the tunnel 57.

Figure 18:
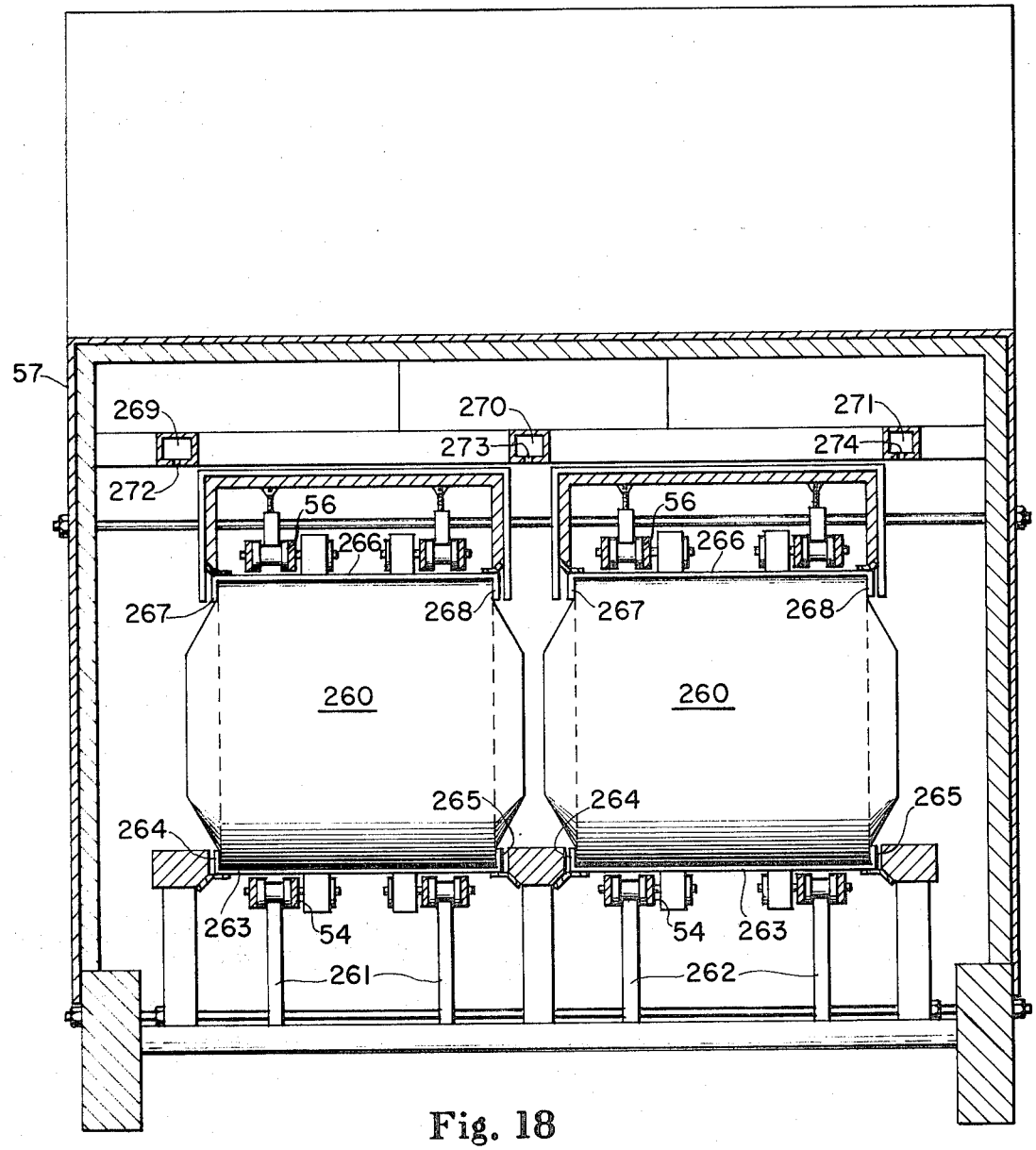
FIG. 18 is a fragmentary end elevation in cross section illustrating the major components of the heat shrink section taken on the line 18—18 of FIG. 2.

FIG. 18 illustrates the side-by-side lower conveyors 54 suitably supported as at 261 and 262 and the side-by-side protective belts 56. Each of the conveyors 54 includes a plurality of adjoining protective plates 263 having upwardly extending ends 264 and 265. Similarly, the protective belts 56 include adjoining protective plates 266 each having downwardly extending ends 267 and 268. The use of the protective plates 263 and 266 results in shielding the major side panels of the banded packages 260 from the hot shrinkage air in the tunnel 57 so that shrinkage is controlled and substantially limited to the rounded portions of the projecting ends 37a and 37b illustrated in FIG. 23.

Hot air is supplied for shrinkage purposes from a suitable source to the manifolds 269, 270 and 271 whereupon it is discharged through the openings 272, 273 and 274. It will be understood that each of the manifolds 269, 270 and 271 contains a plurality of spaced openings 272, 273 and 274 throughout the length of the tunnel 57. As a result of this step, the film is selectively shrunk in the desired manner so that the banded package is transformed from the condition illustrated in FIG. 23 wherein the edges 37a and 37b of the band 37 extend beyond the side faces of the rolls to a condition as illustrated in FIG. 24 wherein the edges of the band are snugly shrunk down without wrinkles as illustrated by the shrunk down end 39.

The fully banded packages are then discharged from the shrink tunnel 57 and passed to a conveyor 57a, where, as illustrated in FIG. 1, the two rows of partially completed packages are held against a divider member 275 by means of the clamps 59 and 60. This permits alternate release of the banded packages from the heat shrink section 55 to the end panel cutting and sealing section 58 by means of suitable and conventional controls for the clamp members 59 and 60.

End Panel Cutting and Sealing Section

The banded packages 260 are delivered alternately into successive buckets 61 of the conveyor 62 to move the packages into position for receiving end panels 40 of the general shape illustrated in FIG. 25. The end panels are cut successively from the film 64 supplied from the roll 276 in FIG. 19 and fed over the idlers 277, 278, 279 and 280 between the measuring roll 281 and the nip roll 282.

The film 64 is fed to the intermittently rotating indexing drum 63 which includes a cutting station shown generally at 283 and a sealing station shown generally at 284. The conveyor 62 is operated similarly so that a banded package 260 is aligned with the sealing station 284 during dwell of the end panel cutting and sealing section of the apparatus.

The indexing drum 63 is composed of a plurality of vacuum plates 285 alternately spaced between the vacuum shoes 286, the latter being used for carrying the end panels 40 from the cutting station 283 to the sealing station 284.

Figure 20:
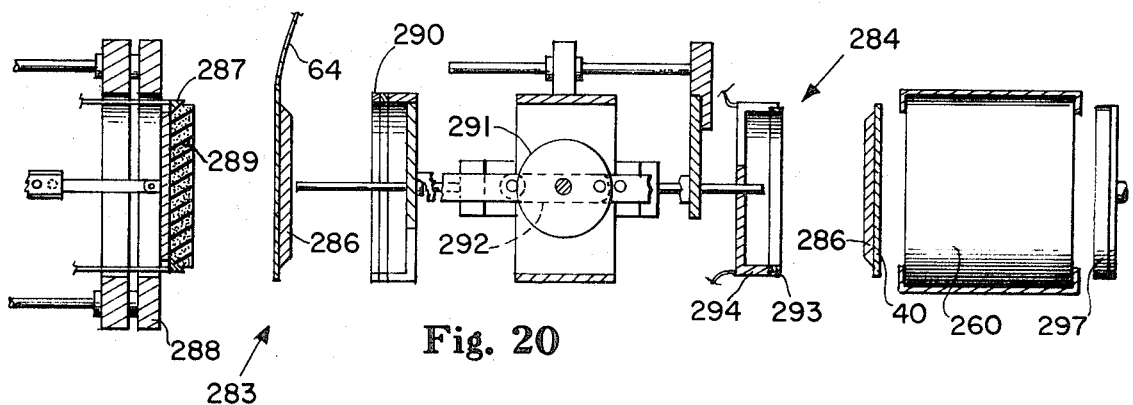
FIG. 20 is a fragmentary elevation in cross section illustrating the major components for cutting and sealing the end panels prior to initiation of cutting and sealing.
Figure 22:
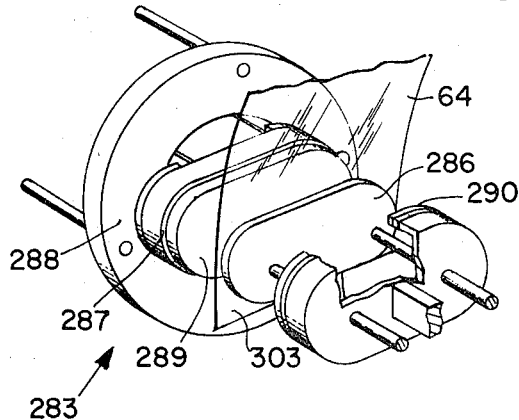
FIG. 22 is a fragmentary perspective view showing the portion of the end panel cutting section which cuts the end panels from a continuous packaging film.

As best illustrated in FIGS. 20 and 22, the cutting station 283 comprises a hot blade cutter 287 supported by the member 288 and having a sponge member 289 centrally mounted therein. An anvil 290 which coacts with the cutter 287 is reciprocable by means of the crank 291 and the connecting rod 292. The crank 291 is mounted for rotation centrally of the indexing drum 63 and is provided with a suitable drive causing it to move through one-half cycle as the shoe 286 dwells at the cutting station 283.

Figure 19:
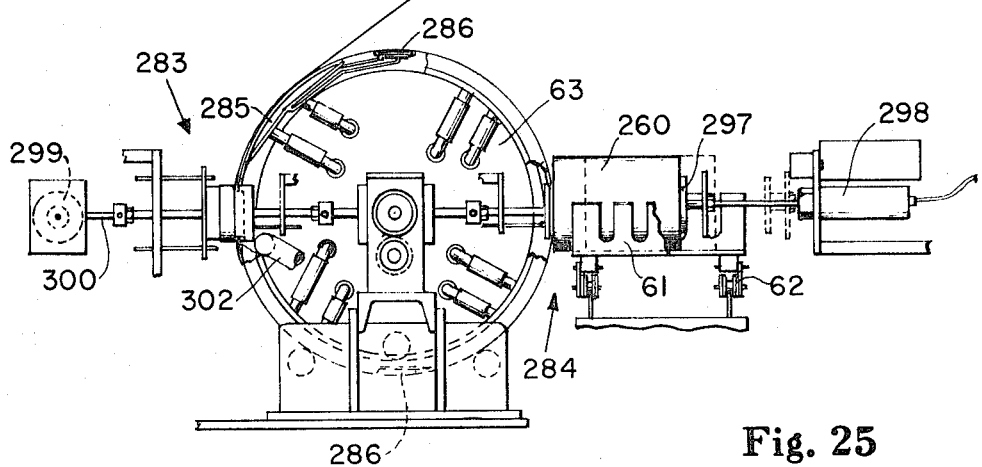
FIG. 19 is a fragmentary end elevation illustrating one of the end panel cutting and sealing turrets of the machine.
Figure 21:
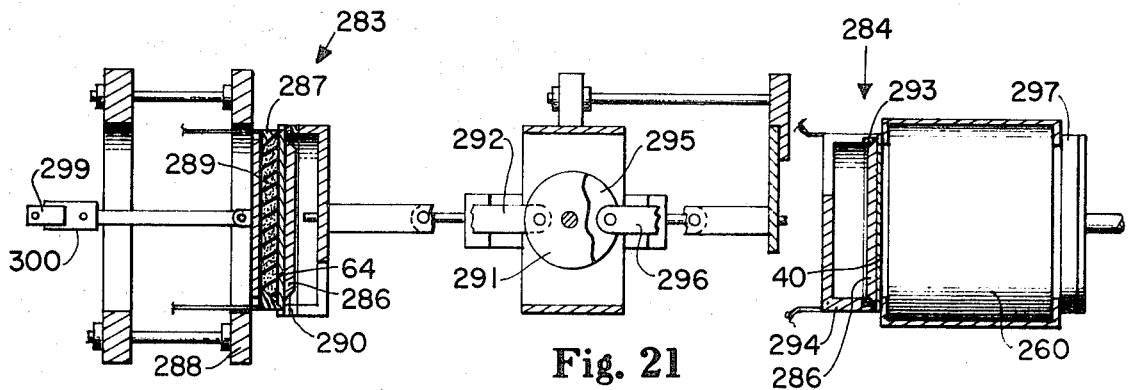
FIG. 21 is a fragmentary elevation in cross section similar to FIG. 20 showing the same components in their actuated state in which an end panel is cut on one side and sealed to the package on the opposite side.

The sealing station 284 includes the heated sealer 293 supported by the member 294 which in turn is mounted for reciprocating movement in timed relation to the indexing of the drum 63 by means of the crank 295 (the cranks 291 and 295 are separately supported and driven) and the connecting rod 296 there being suitable guides provided to maintain alignment of the various parts as they move through the cycle. FIGS. 19, 20 and 21 also illustrate a clamping pad 297 actuated by the air cylinder 298 (FIG. 19) in order to move the banded package 260 snugly against the end panel 40 supported by the shoe 286 at the sealing station 284 in the manner illustrated in FIG. 21.

As the end panel cutting and sealing section moves through its normal cycle, the film 64 is brought into position over a shoe 286 at the cutting station 283 in the manner illustrated in FIGS. 19 and 20. The crank 291 is rotated bringing the anvil 290 into juxtaposition with the shoe 286 as illustrated in FIG. 21. Simultaneously the cutter 287 is moved forward by the member 288 in response to the crank 299 (which is turned in unison with the crank 291) actuating the connecting rod 300. This causes the sponge 289 to bear against the film 64 as shown in FIG. 21 and also brings forward the hot blade cutter 287 causing a panel 40 to be cut from the continuous film 64 whereupon the anvil 290 and the cutter 287 are withdrawn leaving the panel 40 attached to the vacuum shoe 286. Scrap material 303 (FIG. 22) is removed by the vacuum removal device 302 (FIG. 19).

On the next cycle, the cut panel 40 is indexed to the bottommost position illustrated in FIG. 19 and on the subsequent cycle it comes into position for being seamed to the banded package at the sealing station 284. In this portion of the cycle, the clamping pad 297 is initially actuated by the air cylinder 298 causing the banded package 260 to be moved against the end panel 40 held by the shoe 286 as shown in FIG. 21. Subsequent thereto, the heated sealer 293 is moved forward by the member 294 in response to the actuation of the crank 295 (which is rotated in unison with the cranks 291 and 299) and connecting rod 296 causing the heated sealing member 293 to form a heat seal at the periphery of the end panel 40. This seal corresponds to the seal 42 illustrated in FIG. 25 of the drawings.

Upon completion of the sealing of the end panel 40 by its attachment to the banded package, the conveyor 62 is indexed to the second indexing drum 66 illustrated in FIGS. 1 and 2. The second indexing drum 66 is identical in operation to the first indexing drum 63 heretofore described. Consequently, the second indexing drum 66 applies a second end panel, if desired, to the other end of the package in order to fully enclose the rolls. It would, of course, be possible to eliminate the second end panel if it were desired to merely provide a single end panel for the package. For that matter, it would even be possible to eliminate both end panels in any case where a banded package alone were desired. However, in most instances and particularly in the packaging of toilet tissue and other person products, it is desirable to completely enclose and encase the package in order to prevent contamination and soiling of the product prior to its use.

While particular embodiments of the invention have been illustrated and described it will be obvious to those skilled in the art that various changes and modifications can be made without departing from the spirit and scope of the invention and it is intended that all such changes and modifications are within the scope of this invention.

What is claimed as new is:

1. An apparatus for packaging a plurality of cylindrical articles comprising infeed conveyor mans for delivering said articles to a banding section, said infeed conveyor means including a pair of oppositely disposed clamping jaws, means for moving said jaws into engagement with the articles being forwarded on said infeed conveyor means, and means for simultaneously raising said jaws and the clamped articles to raise the latter from the infeed conveyor means to temporarily withhold feeding of articles to said banding section, said banding section including a banding drum, means for rotating said banding drum, means at said banding section for cutting a length of wrapping film and interposing said film between said drum and said articles, means for wrapping said film around said articles to form a band having lapped ends with protruding side edges, means for sealing said lapped ends to complete the band around said articles, means for conveying said banded articles through a heat shrink section to shrink said protruding side edges against the flat end faces of the articles, means for conveying said banded packages to an end panel cutting and sealing section, and means at said last mentioned section for cutting at last one end panel and sealing it to the shrunken protruding ends of the band at the end faces of the articles.

2. An apparatus as claimed in claim 1 wherein said banding drum includes a radially movable platform, said length of wrapping film being placed to extend over said platform, a pair of tucker bars pivoted to said banding drum and moved in response to the radial movement of said platform such that radial inward movement of said platform causes said tucker bars to hold said articles on said drum while simultaneously partially wrapping said film therearound.

3. An apparatus as claimed in claim 1 wherein said heat shrink section includes a conveyor having protective plates for receiving and shielding the lower portion of said banded articles, a protective belt having protective plates for engaging and shielding the upper portion of said banded articles, said protective plates covering the major side surfaces of the bands surrounding said articles such that shrinkage of said band is confined to the rounded protruding ends thereof.

4. An apparatus as claimed in claim 1 wherein said end panel cutting and sealing section includes an indexing drum, a plurality of spaced vacuum shoes on the periphery of said drum, a cutting station, means for feeding a wrapping film to said cutting station, means for cutting an end panel at said cutting station, said cut end panel being held by a vacuum shoe as said indexing drum is turned to deliver said panel to a sealing station, said sealing station including a heat sealer, means for moving said banded package into end panel receiving position at said sealing station, said end panel being heat sealed to the end of said banded package by said heat sealer at said sealing station.

5. An apparatus for packaging a plurality of cylindrical articles comprising infeed conveyor means for delivering said articles to a banding section, said banding section including a banding drum and means for cutting a length of wrapping film and interposing said film between said banding drum and said articles, means for rotating said banding drum, said banding drum including a radially movable platform, said length of wrapping film being placed to extend over said platform, a pair of tucker bars pivoted to said banding drum and moved in response to the radial movement of said platform such that radial inward movement of said platform causes said tucker bars to hold said articles on said drum while simultaneously partially wrapping said film therearound, means for wrapping said film around said articles to form a band having lapped ends with protruding side edges, means for sealing said lapped ends to complete the band around said articles, means for conveying said banded articles through a heat shrink section to shrink said protruding side edges against the flat end faces of the articles, means for conveying said banded packages to an end panel cutting and sealing section, and means at said last mentioned section for cutting at least one end panel and sealing it to the shrunken protruding ends of the band at the end faces of the articles.

6. An apparatus as claimed in claim 5 wherein said heat shrink section includes a conveyor having protective plates for receiving and shielding the lower portion of said banded articles, a protective belt having protective plates for engaging and shielding the upper portion of said banded articles, said protective plates covering the major side surfaces of the bands surrounding said articles such that shrinkage of said band is confined to the rounded protruding ends thereof.

7. An apparatus as claimed in claim 5 wherein said end panel cutting and sealing section includes an indexing drum, a plurality of spaced vacuum shoes on the periphery of said drum, a cutting station, means for feeding a wrapping film to said cutting station, means for cutting an end panel at said cutting station, said cut end panel being held by a vacuum shoe as said indexing drum is turned to deliver said panel to a sealing station, said sealing station including a heat sealer, means for moving said banded package into end panel receiving position at said sealing station, said end panel being heat sealed to the end of said banded package by said heat sealer at said sealing station.

8. An apparatus for packaging a plurality of cylindrical articles comprising infeed conveyor means for delivering said articles to a banding section, said banding section including a banding drum, means for rotating said banding drum, means at said banding section for cutting a length of wrapping film and interposing said film between said drum and said articles, means for wrapping said film around said articles to form a band having lapped ends with protruding side edges, means for sealing said lapped ends to complete the band around said articles, means for conveying said banded articles through a heat shrink section to shrink said protruding side edges against the flat end faces of the articles, said heat shrink section including a conveyor having protective plates for receiving and shielding the lower portion of said banded articles, a protective belt having protective plates for engaging and shielding the upper portion of said banded articles, said protective plates covering the major side surfaces of the bands surrounding said articles such that shrinkage of said band is confined to the rounded protruding ends thereof, means for conveying said banded packages to an end panel cutting and sealing section, and means at said last mentioned section for cutting at least one end panel and sealing it to the shrunken protruding ends of the band at the end faces of the articles.

9. An apparatus as claimed in claim 8 wherein said end panel cutting and sealing section includes an indexing drum, a plurality of spaced vacuum shoes on the periphery of said drum, a cutting station, means for feeding a wrapping film to said cutting station, means for cutting an end panel at said cutting station, said cut end panel being held by a vacuum shoe as said indexing drum is turned to deliver said panel to a sealing station, said sealing station including a heat sealer, means for moving said banded package into end panel receiving position at said sealing station, said end panel being heat sealed to the end of said banded package by said heat sealer at said sealing station.

10. An apparatus as claimed in claim 2 wherein said heat shrink section includes a conveyor having protective plates for receiving and shielding the lower portion of said banded articles, a protective belt having protective plates for engaging and shielding the upper portion of said banded articles, said protective plates covering the major side surfaces of the bands surrounding said articles such that shrinkage of said band is confined to the rounded protruding ends thereof.

11. An apparatus as claimed in claim 2 wherein said end panel cutting and sealing section includes an indexing drum, a plurality of spaced vacuum shoes on the periphery of said drum, a cutting station, means for feeding a wrapping film to said cutting station, means for cutting an end panel at said cutting station, said cut end panel being held by a vacuum shoe as said indexing drum is turned to deliver said panel to a sealing station, said sealing station including a heat sealer, means for moving said banded package into end panel receiving position at said sealing station, said end panel being heat sealed to the end of said banded package by said heat sealer at said sealing station.

12. An apparatus as claimed in claim 6 wherein said end panel cutting and sealing section includes an indexing drum, a plurality of spaced vacuum shoes on the periphery of said drum, a cutting station, means for feeding a wrapping film to said cutting station, means for cutting an end panel at said cutting station, said cut end panel being held by a vacuum shoe as said indexing drum is turned to deliver said panel to a sealing station, said sealing station including a heat sealer, means for moving said banded package into end panel receiving position at said sealing station, said end panel being heat sealed to the end of said banded package by said heat sealer at said sealing station.

13. An apparatus as claimed in claim 10 wherein said end panel cutting and sealing section includes an indexing drum a plurality of spaced vacuum shoes on the periphery of said drum, a cutting station, means for feeding a wrapping film to said cutting station, means for cutting an end panel at said cutting station, said cut end panel being held by a vacuum shoe as said indexing drum is turned to deliver said panel to a sealing station, said sealing station including a heat sealer, means for moving said bonded package into end panel receiving position at said sealing station, said end panel being heat sealed to the end of said banded package by said heat sealer at said sealing station.

14. An apparatus for packaging a plurality of cylindrical articles comprising a banding drum, means for rotating said banding drum, a dead plate for receiving and supporting the articles over the banding drum, vacuum means for picking up said articles from said dead plate and placing them in position on said banding drum, means for retracting said dead plate after said articles are picked up by said vacuum means, means for receiving articles from said vacuum means and means for retaining them on said banding drum, means for cutting a length of wrapping film and interposing said film between said drum and said articles prior to the deposition of said articles on said drum, means associated with said drum for wrapping said film around said articles to form a band having lapped ends, means for sealing said lapped end to complete the band around said articles.

15. An apparatus for packaging a plurality of cylindrical articles comprising a banding drum, means for rotating said banding drum, means for receiving and retaining articles on said banding drum, said last mentioned means including a radially movable platform, means for cutting a length of wrapping film and interposing said film between said drum and said articles, said length of wrapping film being placed to extend over said platform, a pair of tucker bars pivoted to said banding drum and moved in response to the radial movement of said platform such that radial inward movement of said platform causes said tucker bars to hold said articles on said drum while simultaneously partially wrapping said film therearound, means associated with said drum for wrapping said film around said articles to form a band having lapped ends, means for sealing said lapped ends to complete the band around said articles.

16. An apparatus as claimed in claim 15 including a dead plate for receiving the articles over the banding drum, vacuum means for picking up said articles from said dead plate and placing them in position on said banding drum.

17. An apparatus as claimed in claim 16 including means for retracting said dead plate after said articles are picked up by said vacuum means.

18. An apparatus as claimed in claim 16 wherein said vacuum means includes a plurality of vacuum cups supported by at least one carriage arm and means for oscillating said carriage arm from its picking up position to its position of placing said articles on said banding drum.

19. An apparatus for packaging a plurality of cylindrical articles comprising a banding drum, means for rotating said banding drum, a dead plate for receiving and supporting the articles over the banding drum, vacuum means for picking up said articles from said dead plate and placing them in position on said banding drum, means for retracting said dead plate after said articles are picked up by said vacuum means, means for receiving articles from said vacuum means and means for retaining them on said banding drum, said vacuum means including a plurality of vacuum cups supported by at least one carriage arm and means for oscillating said carriage arm from its picking up position to its position of placing said articles on said banding drum, means for cutting a length of wrapping film and interposing said film between said drum and said articles prior to the deposition of said articles on said drum, means associated with said drum for wrapping said film around said articles to form a band having lapped ends, means for sealing said lapped ends to complete the band around said articles.

20. An apparatus as claimed in claim 19 wherein said banding drum includes a radially movable platform, said length of wrapping film being placed to extend over said platform, a pair of tucker bars pivoted to said banding drum and moved in response to the radial movement of said platform such that radial inward movement of said platform causes said tucker bars to hold said articles on said drum while simultaneously partially wrapping said film therearound.

21. A method for packaging a plurality of cylindrical articles comprising the steps of delivering a group of cylindrical articles into position over a continuously rotating banding drum for subsequent delivery thereto for wrapping, placing a length of wrapping film into wrapping position on said banding drum, picking up said delivered articles over said banding drum and accelerating them into approximate matched angular speed with the periphery of said banding drum, depositing said group of articles on said wrapping film, wrapping said length of wrapping film around said articles to form a band having lapped ends with protruding side edges, sealing said lapped ends to complete the band around said articles, shrinking said protruding edges of said band against the flat end faces of said articles, and cutting at least one end panel and sealing it to the shrunken protruding ends of the end faces of the articles 22. A method as claimed in claim 21 including the step of shielding the upper and lower portions of said banded articles prior to shrinking so that the shrinkage of said band is confined to the protruding edges thereof.

23. An apparatus for packaging a plurality of cylindrical articles comprising infeed conveyor means for delivering said articles to a banding section, said banding section including a banding drum, means for rotating said banding drum, means at said banding section for cutting a length of wrapping film and interposing said film between said drum and said articles, means for wrapping said film around said articles to form a band having lapped ends with protruding side edges, means for sealing said lapped ends to complete the band around said articles, means for conveying said banded articles through a heat shrink section to shrink said protruding side edges against the flat end faces of the articles, means for conveying said banded packages to an end panel cutting and sealing section, means at said last mentioned section for cutting at least one end panel and sealing it to the shrunken protruding ends of the band at the end faces of the articles, said end panel cutting and sealing section including an indexing drum, a plurality of spaced vacuum shoes on the periphery of said drum, a cutting station, means for feeding a wrapping film to said cutting station, means for cutting an end panel at said cutting station, said cut end panel being held by a vacuum shoe as said indexing drum is turned to deliver said panel to a sealing station, said sealing station including a heat sealer, means for moving said banded package into end panel receiving position at said sealing station, said end panel being heat sealed to the end of said banded package by said heat sealer at said sealing station.

* * * * *